United States Patent [19]

F'Geppert

[11] 4,266,591
[45] May 12, 1981

[54] LOCKING CONNECTOR
[75] Inventor: Erwin F'Geppert, Novi, Mich.
[73] Assignee: The United States of America as represented by the Secretary of the Army, Washington, D.C.
[21] Appl. No.: 50,001
[22] Filed: Jun. 18, 1979
[51] Int. Cl.³ .............................................. F16B 39/28
[52] U.S. Cl. ................................. 411/167; 403/408; 411/500
[58] Field of Search .................. 151/43; 85/9 E, 9 R, 85/1 R; 403/408

[56] References Cited

U.S. PATENT DOCUMENTS

| 768,591 | 8/1904 | Elfborg | 85/9 E |
|---|---|---|---|
| 985,269 | 2/1911 | McIntyre et al. | 151/43 |
| 1,097,185 | 5/1914 | Oehrle | 85/9 E |
| 1,998,116 | 4/1935 | Bone | 85/9 E |

FOREIGN PATENT DOCUMENTS

| 1218840 | 12/1959 | France | 85/9 E |
|---|---|---|---|
| 2831 | 1/1919 | Netherlands | 85/9 E |

Primary Examiner—Ramon S. Britts
Attorney, Agent, or Firm—Peter A. Taucher; John E. McRae; Nathan Edelberg

[57] ABSTRACT

A locking connector that includes a shaft snugly fitting within circular openings in at least one of the two members to be connected together. The shaft carries a threaded pin that is eccentric to the shaft axis; a nut is threaded onto the pin to complete the locking connection between the two members.

1 Claim, 8 Drawing Figures

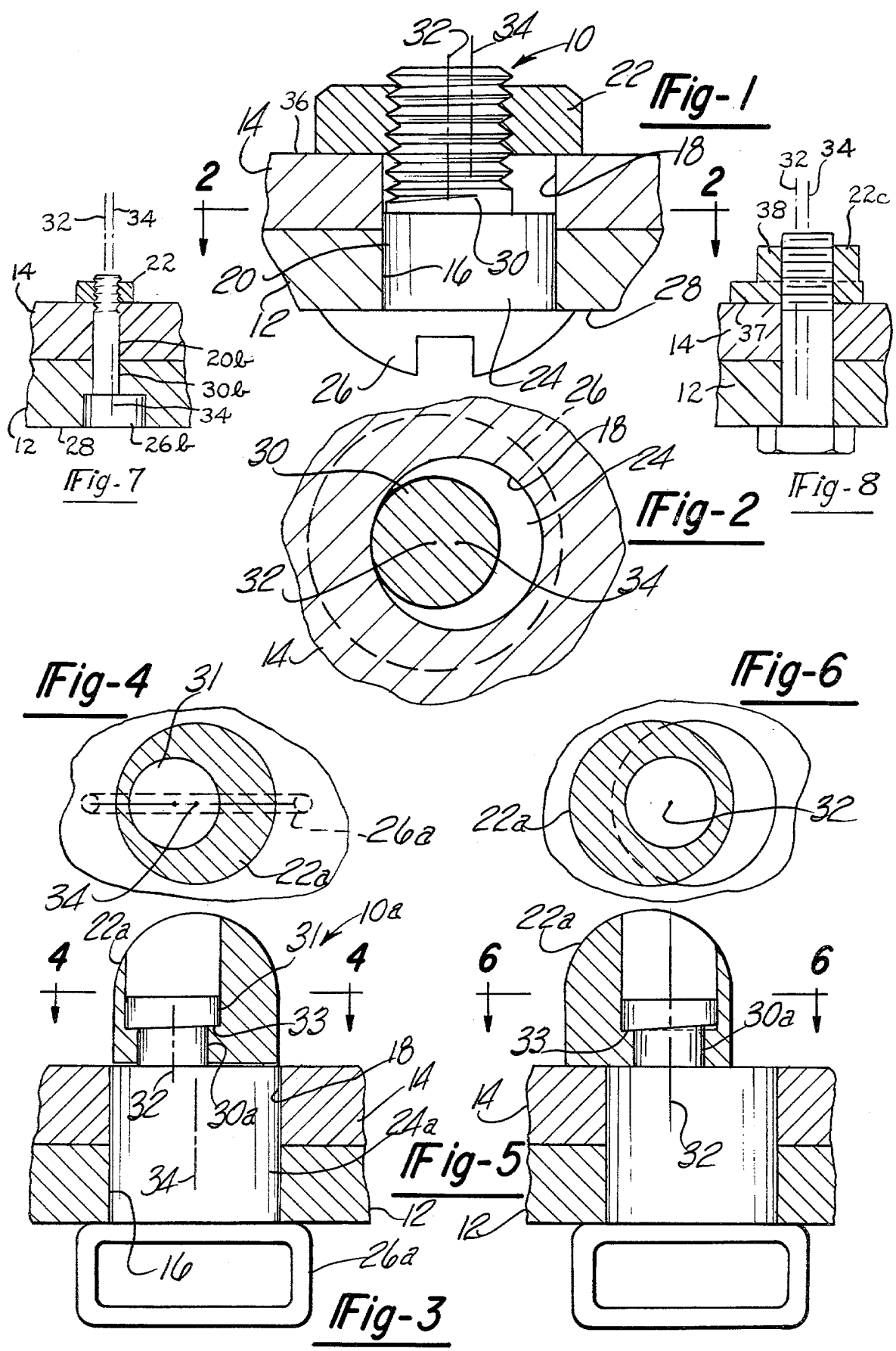

LOCKING CONNECTOR

The invention described herein may be manufactured, used, and licensed by or for the Government for governmental purposes without payment to me of any royalty thereon.

BACKGROUND AND SUMMARY OF THE INVENTION

This invention relates to locking connectors, particularly connectors of the nut-bolt type. One aim of the invention is to provide a connector assembly wherein the axial frictional locking forces are different at various points around the connector axis, whereby mating thread surfaces are precluded from a floating condition that could result in a loosening of the threaded connections.

THE DRAWINGS

FIG. 1 is a sectional view taken through a connector assembly embodying the invention.

FIG. 2 is a sectional view taken on line 2—2 in FIG. 1.

FIG. 3 is a sectional view taken through a second connector embodying the invention.

FIG. 4 is a sectional view on line 4—4 in

FIG. 3.

FIG. 5 is a sectional view similar to FIG. 3, but taken with the connector components in a different position of adjustment.

FIG. 6 is a sectional view taken on line 6—6 in FIG. 5.

FIGS. 7 and 8 are sectional views illustrating other embodiments of the invention.

Referring more particularly to FIGS. 1 and 2, there is shown a locking connector assembly 10 arranged to connect two plate-like members 12 and 14 together. The members are formed with aligned circular openings 16 and 18.

Connector assembly 10 consists of two separable components, namely a bolt 20 and hexagonal nut 22. Bolt 20 includes a cylindrical shaft 24 having a diameter that enables the shaft to snugly fit into the circular openings 16 and 18 in members 12 and 14. An enlarged circular head 26 is joined or connected to the lower end of shaft 24 to engage the lower face 28 of member 12. Projecting upwardly from shaft 24 is a circular pin or stem 30 having a smaller diameter than the shaft. Stem 30 is threaded to mate with internal threads on the aforementioned nut 22. Stem 30 and head 22 are centered on an axis 32 that is eccentric to axis 34 of shaft 24. Head 26 is shown to be concentric about axis 32 although it could be centered on axis 34 if so desired. As illustrated in the drawing, head 26 has a screw driver slot for initial torque application to the connector assembly. However the eccentricity of stem 30 relative to axis 34 is such that a screw driver slot in head 26 is not essential; torque applied to nut 22 around axis 32 will act off center to shaft 24, thus precluding any rotation of the bolt during initial assembly operations.

The novel feature of the FIG. 1 connector assembly is the eccentric disposition of pin or stem 30 relative to shaft 24. This disposition is advantageous in that the connector assembly has a lessened likelihood of loosening under expected disturbances, such as vibration, shock or continuous high loadings. When nut 22 is tightened on threaded pin 30 against the upper face 36 of member 14 the resultant axial load places nut 22, and plate members 12 and 14 in compression; shaft 24 and pin 30 are placed in tension. Due to the eccentric disposition of pin 30 the total axial force is distributed unevenly in the structures surrounding shaft 24. Assuming that circle 26 in FIG. 2 represents the area under compression, it will be seen that the left half of the circle comprehends a considerably greater wall area than the right half of the circle (due to the eccentric disposition of pin 30 within opening 18). The total resistance to axial compressive force applied to the left half of circle 26 is significantly greater than the resistance to axial force applied to the right half of the circle.

The uneven force resistance distribution is considered beneficial in counteracting a condition which I will here term "thread floating". Such a condition can occur momentarily when axial forces on the meshed threads are reduced for any reason, such as vibration, reaction to shock or temporary resilient deformation of materials. In the unstressed condition of the threaded components the facing surfaces of the female threads are slightly further apart than the male surfaces in order to permit the nut to be screwed onto the bolt. During service, should the facing thread surfaces be exactly parallel and free from axial stress the slight clearances between the surfaces can cause a floating condition of the female nut on the bolt. Should an axial force then be applied to the nut the nut is apt to cam on the bolt threads into a loosened condition. Even a slight loosening of the nut is sufficient to destroy the desired connection.

An aim of the structure shown in FIGS. 1 and 2 is to provide different axial reaction forces on different sections of the meshed threads, to thereby avoid the thread surface parallelism that can lead to loosening of the nut on the bolt. The uneven distribution of reaction forces causes the female thread surfaces to be slightly tilted relative to the male thread surfaces, thereby avoiding the undesired parallelism. As seen in FIG. 1 the tilting effect is achieved with a standard nut 22 having an outside diametrical dimension greater than the diameter of aligned openings 16 and 18. If a relatively large diameter washer (not shown) were used between the nut and face 36 of plate member 14 then a smaller diameter nut could be used.

Variations of the structure shown in FIGS. 1 and 2 can be visualized. One such variation is shown in FIGS. 3 through 6. The structure there shown comprises a connector 10a that includes a large diameter shaft 24a connected to a head 26a that is constructed in the shape of a handle; manual turning force applied to the handle rotates the shaft around its axis 34.

Extending upwardly from shaft 24a is a circular pin 30a having a flange 31 for retention of a relatively large circular head 22a on the pin. Head 22a is preferably a one piece component formed by molding same around the pin so that head 22a is free for rotation on pin 30a. The diameter of head 22a is substantially the same as the diameter of shaft 24a, whereby when the head and shaft are aligned (in the FIG. 3 condition) the connector assembly can be inserted upwardly through aligned openings 16 and 18 in the plate members 12 and 14. Thereafter the circular head 22a can be manually turned around axis 32 of pin 30a to the position depicted in FIGS. 5 and 6.

FIG. 7 illustrates a bolt-nut type connector having some of the advantages of the connector mechanism shown in FIG. 1. In the FIG. 7 arrangement a bolt 20b is provided with a circular threaded stem 30b centered on an axis 32 that is offset from axis 34 of a circular bolt head 26b. Circular aligned openings in the plate members accommodate the threaded stem 30b. Head 26b is received within a circular counterbore in plate member 12, said counterbore being centered on axis 34.

The eccentricity of stem 30b in relation to head 26b causes the bolt to have a non-rotary fit in plate members 12 and 14. Therefore, the bolt functions in the same fashion as a square head bolt in a square counterbore, even though the structure is constructed with circular surfaces.

It will be noted that the end surface of bolt head 26b is flush with surface 28 of plate element 12. The FIG. 7 construction is especially useful where it is necessary that plate element 12 present a smooth continuous surface 28 devoid of screw slots or other obstructions, as for example for anti-theft purposes or for aerodynamic reasons. Cylindrical head 26b could extend outwardly beyond surface 28, as for example in the case of a trailer kingpin construction; in that case the downwardly projecting portion of head 26b would be grooved around its periphery to cooperate with a mating fifth wheel (not shown). Alternately, head 26b could be provided with an ornamental external configuration projecting beyond surface 28.

A feature of interest as regards the FIG. 7 structure is the use of circular offset surfaces to position the bolt in a non-rotary attitude, without reliance on external screw slots or wrench flats on head 26b. The FIG. 7 structure uses a conventional nut 22 in a conventional fashion. Hence it does not offer the same assurance against "thread floating" that is offered by the FIG. 1 arrangement.

FIG. 8 illustrates a nut-bolt type connector that is similar to conventional connectors except for the structure of the nut 22c. Nut 22c includes a circular lower section 36 engaged against the face of plate 14 and a hexagonal upper section 38. Hexagonal section 38 is centered on the axis 34 of the bolt, whereas circular section 36 is centered on an axis 32 offset from the bolt axis. When a tightening torque is applied to hexagonal section 38 of the nut the relatively large plate 14 face area at the left half of the nut will exert greater resistance to axial compressive forces than will the relatively small face area at the right half of the nut. The system will therefore provide a nut-tilting action that tends to counteract the "thread floating" condition mentioned in connection with FIG. 1.

I wish it to be understood that I do not desire to be limited to the exact details of construction shown and described for obvious modifications will occur to a person skilled in the art.

I claim:

1. In combination, a locking connector joining two members together, said members having aligned circular openings of the same diameter therethrough; said connector including a large diameter circular shaft having the same dimension as the aforementioned circular openings, said circular shaft having an axis 34 coincident with the axis of the circular openings, said shaft extending entirely through one of the members to be joined, and partially through the other member so as to align said two members together; a head extending from one end of the shaft, said head having an axis 32, offset and parallel to axis 34, said head being of sufficient size to overlap the adjacent member's surface area surrounding the adjacent circular opening; a relatively small diameter threaded stem extending from the other end of the shaft, said stem being oriented on an axis 32, which is offset and parallel to the aforementioned shaft axis 34; and a nut 22 threaded on the stem, said nut overlapping the adjacent member's surface area surrounding the associated circular opening, the offsetting of axis 32 of the threaded stem from axis 34 of the large diameter circular shaft providing an unoccupied space 18 within said other member, the resulting uneven distribution of reaction forces causing a slight tilt of the nut thread surfaces relative to the thread surfaces of the stem thereby eliminating thread parallelism of said nut and said threaded stem, said nut and head cooperatively clamping the two members therebetween.

* * * * *